May 5, 1931.  T. M. LEKA  1,804,352
SAFETY LIFTING AND DESCENDING ACCESSORY FOR AIRCRAFT
Filed May 23, 1930   4 Sheets-Sheet 4
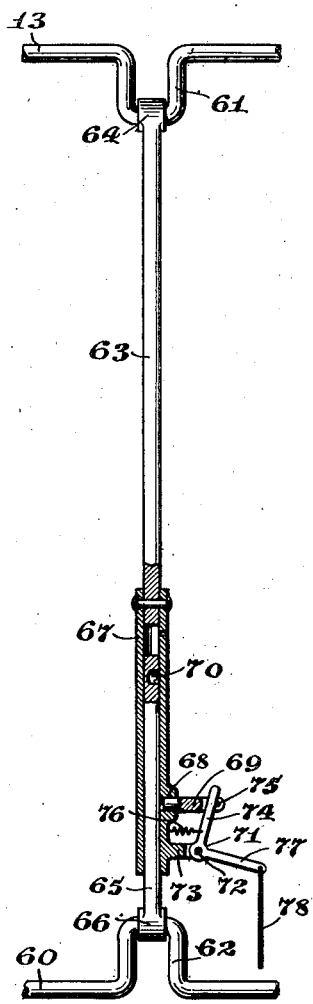
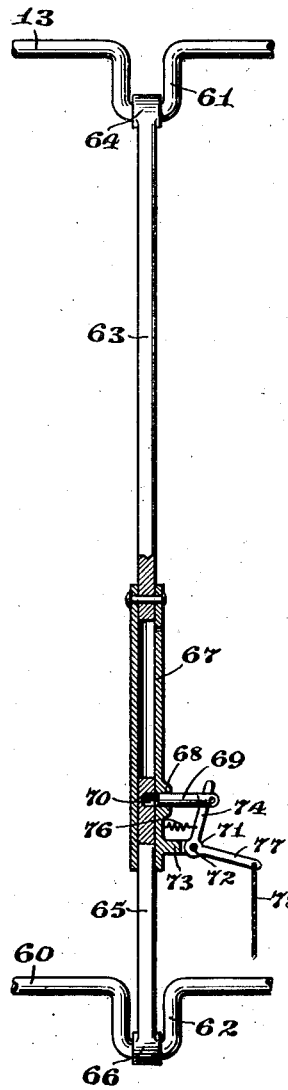
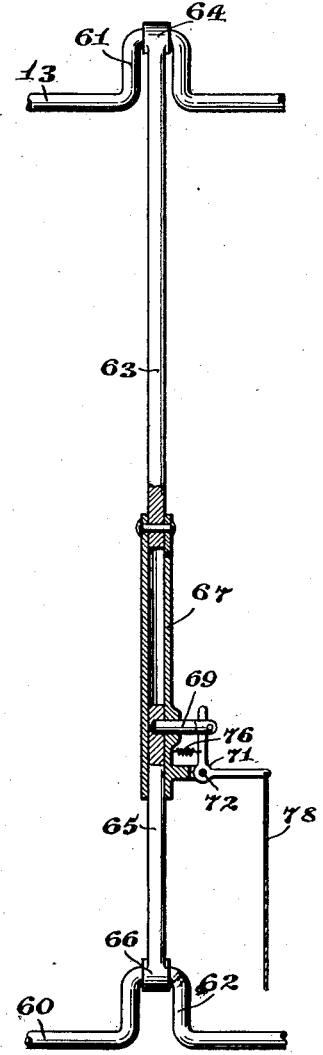
WITNESSES
INVENTOR
Thomas M. Leka
BY
ATTORNEYS Patented May 5, 1931

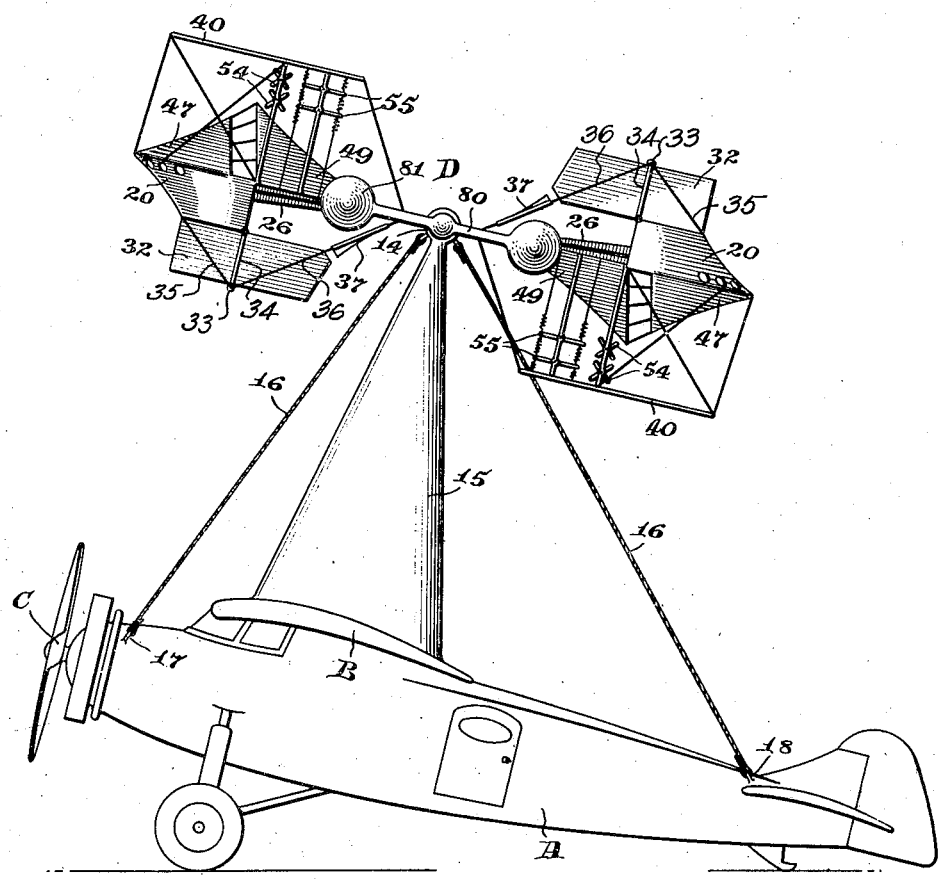

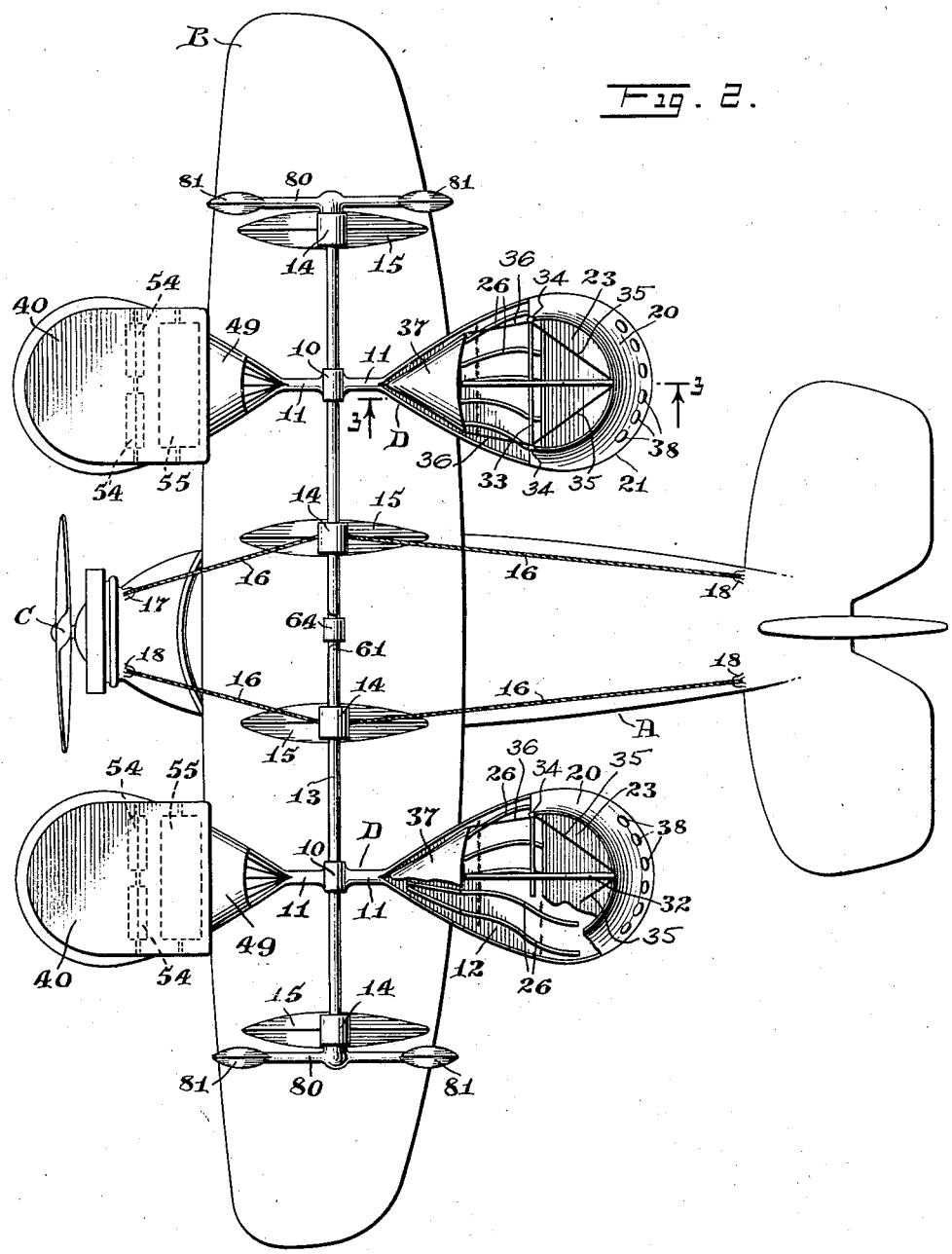

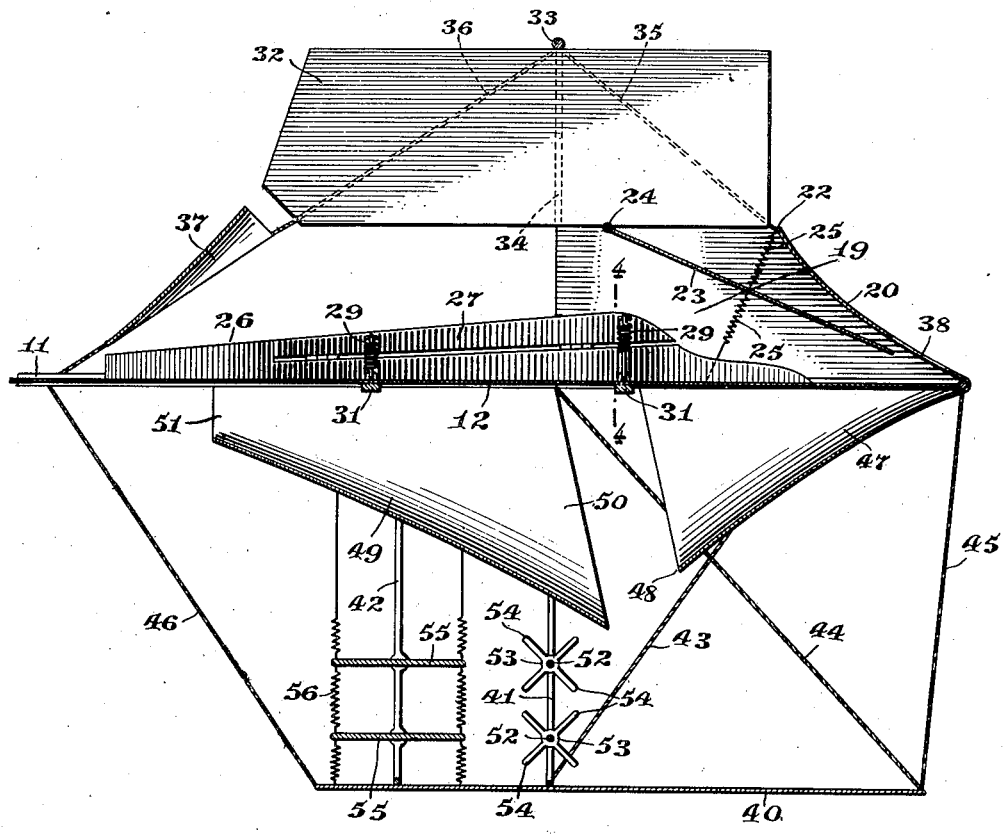
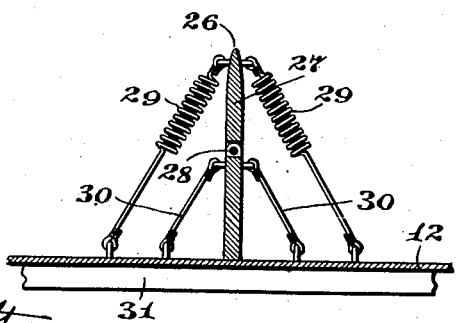

1,804,352

UNITED STATES PATENT OFFICE

THOMAS M. LEKA, OF ENGLEWOOD, NEW JERSEY

SAFETY LIFTING AND DESCENDING ACCESSORY FOR AIRCRAFT

Application filed May 23, 1930. Serial No. 455,073.

This invention relates to aircraft, and has particular reference to an accessory which may be initially built into the craft or subsequently attached thereto, and which is especially designed for airplanes, hydroplanes or other heavier-than-air craft, although not necessarily restricted thereto.

The invention broadly aims to provide a device of the above indicated character constituting means in contra-distinction to a helicopter, by virtue of which heavier-than-air craft may be lifted directly upward or approximately vertically from the ground or other supporting surface without requiring a large area or field for a preliminary take-off run, and which means further functions to permit of the descent of the craft in a substantially vertical path without gliding, whereby to avoid subsequent rolling of the craft incident to a glide, which necessitates a large landing field or surface therefor.

The invention further contemplates in a device of the character set forth, means which in addition to the other purposes previously set forth, affords additional planing surfaces when the craft is in flight, whereby to augment the usual planing surfaces in the sustentation of the craft.

As a further object, the invention aims to provide in an accessory of this character, means which functions as an additional safety factor, which may be rendered active in event of engine failure for the purpose of negotiating a safe forced landing.

More specifically, the invention resides in the provision of an accessory for aircraft as and for the purposes set forth, which employs a rotary member mounted on a horizontal axis disposed transversely of the craft and designed to rotate or turn in a vertical plane, and which preferably includes a prime mover independent of the usual propelling means for the craft, which prime mover is operatively connected with the rotary member for positively driving the same, and which includes coupling means between the member and prime mover which may be rendered active and inactive by the pilot.

As a further feature, the invention embodies an accessory or attachment of the character set forth and as and for the purposes outlined, which may be readily installed on the aircraft at the time of its construction or subsequent thereto without necessitating material alteration in the structure thereof.

Other objects of the invention reside in the comparative simplicity of construction of the accessory and its mode of operation, the economy with which it may be produced, applied and operated and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a side view of an airplane equipped with a device or accessory constructed in accordance with the invention.

Figure 2 is a plan view thereof.

Figure 3 is an enlarged vertical longitudinal sectional view through one of the blades of the rotary member, the same being taken approximately on the line indicated at 3—3 in Figure 2.

Figure 4 is a fragmentary transverse sectional view on a further enlarged scale, taken approximately on the line indicated at 4—4 in Figure 3.

Figures 5, 6 and 7 are fragmentary diagrammatic views illustrating the coupling connection between the shaft of the rotary members and the prime mover for actuating the same, and showing respectively the coupled, and released positions thereof.

Referring to the drawings by characters of reference, A designates the fuselage of an airplane provided with the usual wing structure B and propeller C. The accessory constituting the subject matter of the present invention includes one or more rotary members designated generally by the reference character D, and, in practice, preferably two or more will be used. The members D comprise a hub portion 10 and radial arms 11 which preferably project diametrically opposite from the hub 10 and each of which supports a blade 12. The hub 10 is keyed or otherwise secured to a shaft 13 which is mounted or journaled for rotation on a transverse horizontal axis in suitable bearings 14, whereby the members D may upon rotation of the shaft turn in a vertical plane parallel to the longitudinal axis of the craft. Obviously, the bearings 14 may be supported in any suitable manner, but, as illustrated, said bearings are carried by streamline supporting struts 15 which are attached to the wing structure B. In order to obtain the correct fore and aft balance of the craft when the same is lifted, sustained or lowered by means of the rotary members D, suspension cables 16 are suitably connected with certain of the bearings 14 or upper ends of the struts 15, the lower ends of said cables being attached as at 17 and 18, to the fore and aft portions of the fuselage A.

Each of the blades 12 has attached to its forward or leading face and at its outer end, what will be termed an air scoop 19 which is defined by a concavo-convex marginal flange 20 projecting forwardly from the outer semicircular end 21 of the blade 12. The flange 20 is also of gradually diminishing size toward its outer free edge 22 and has mounted therein a diagonally disposed partition blade 23 which is fulcrumed to the flange as at 24 and which is maintained in a normal intermediate position by virtue of oppositely acting coiled contractile springs 25. The blade 12 also supports on its leading or forward face a plurality of radiating fins 26 which are of an undulating configuration and which are provided with fulcrumed sections 27 at the leading edges thereof, which sections are pivoted thereto as at 28, and which fulcrumed sections are normally maintained in a neutral position by such means as the oppositely acting coiled contractile springs 29. The fins 26 are further braced by guy wires 30 which are attached at one end to the fins and at the opposite end to the blade 12. The blade 12 on its rear or following face is provided with transverse brace bars 31. The blade 12 further supports a longitudinal keel strip 32 which is disposed in a plane perpendicular to the plane of the blade 12, with its lower edge in spaced parallel relation to the leading face of the blade and approximately in line with the plane of the outer free edge 22 of the flange 20 of the air scoop. The keel strip at its outer or leading edge is attached intermediately thereof to a transverse rod 33, which is in turn joined to a pair of rods 34 projecting outwardly from the forward or leading face of the blade 12 approximately at the inner ends of the flange 20. At the juncture of the opposite ends of the rod 33 with the rod 34, a pair of guy wires 35 extend outwardly toward the outer edge of the blade 12 and a pair of guy wires 36 extend inwardly where they are joined with the radial arms 11. Each pair of guy wires 35 and 36 converge toward each other from the rod 33 to the outer edge of the blade 12 and at the point of juncture with the arm 11 respectively. Each pair of guy wires 36 also support a substantially triangular shaped concavo-convex jib piece 37. The flange 20 is further provided adjacent its juncture with the blade 12 with a plurality of air outlet openings 38.

The rear or following face of the blade 12 has supported in spaced parallel relation thereto, a substantially flat auxiliary blade element 40 which is connected with the main blade by rigid rods 41 and 42 and which is suitably braced by cables or guy wires 43, 44, 45 and 46. Between the main blade 12 and auxiliary blade and carried by the outer end of the former is a cowl piece 47 which conforms generally to the shape of the end of the blade 12 to which it is attached but which is transversely arcuate at its free inner edge 48. Spaced inwardly from the cowl piece 47 is a funnel element 49 which is provided with an enlarged arcuate open outer end 50 exceeding the size of the rear end of the cowl piece and projecting outwardly slightly thereover. The funnel element 49 is formed with a reduced or restricted rear outlet end 51 which terminates an appropriate distance from the innermost end of the main blade 12. The rods 41 support on transverse shafts 52 which extend therebetween one or more paddles 53 having radial blades 54 which are mounted on shafts 52 for free rotation. The rods 42 support for swinging movement a pair of flat panels 55 which are normally disposed in planes and in spaced parallel relation to each other and to the blades 12 and 40 and between the auxiliary blade 40 and the funnel element 49. These blades are normally maintained in their parallel relation to each other and to the blades 12 and 40 by coiled contractile springs 56.

The shaft 13 may be driven in any desired manner from the shaft 60 of a motor or prime mover (not shown). As illustrated, the shaft 13 is provided with a crank portion 61, and the shaft 60 with a crank portion 62. A connecting rod section 63 is journaled at its end 64 to the crank portion 60 of the shaft 13, and a connecting rod section 65 is journaled at its end 66 to the crank portion 62 of the motor or prime mover shaft 60. In order to provide means for coupling and uncoupling the connecting rod sections 63 and 65, the former is provided with a tubular end 67 which telescopically receives the free end of the section 65. The tubular end 67 is radially apertured as at 68 to receive therethrough a coupling pin 69, while the free end of the connecting rod section 65 is formed with a keeper recess 70, into which the inner end of the coupling pin is adapted to be projected and from which the same is adapted to be retracted, to selectively couple and uncouple the connecting rod sections 63 and 65. In order to provide remote control means for shifting the coupling pin, a bell crank lever 71 is provided, which is fulcrumed as at 72 on a bracket 73 carried by the tubular end 67 of the connecting rod section 63. One arm 74 of the bell crank extends into the bifurcated end 75 of the coupling pin and functions upon swinging movement of the arm 74 in opposite directions, to project the coupling pin inwardly or retract the same outwardly. A coiled contractile spring 76 operates to normally move the bell crank in a direction to swing the arm 74 for projecting a coupling pin inwardly into its active position for coupling the connecting rod sections together. The remaining arm 77 of the bell crank has attached thereto a cable or other flexible element 78 which leads therefrom to the cockpit or pilot's compartment of the craft, whereby the pilot may optionally effect the connection and disconnection of the connecting rod sections for driving the shaft 13 or for rendering said shaft inactive.

In order to obtain the correct static and dynamic balance of the shaft 13, diametrically disposed radial arms 80 are carried by the shaft 13 and are formed of weighted outer terminals 81 which act in the capacity of a fly-wheel.

In use and operation, the craft is launched by initially starting the prime mover, which drives the rotary members D with the connecting rod sections 63 and 65 in coupled relation. Rapid rotation of the members D obviously causes air to be scooped up in front of the blades 12 by the air scoops 19 on the outer edges of the leading faces of the blades, the air being compressed in the scoops and a proportion thereof being allowed to escape through the outlet openings 38. At the same time, a proportion of the air will be trapped between the fins 26 to further feed air into the scoops 19. The keel strips will split the air, while the jib pieces 37 will fend off a certain proportion of the air at the inner ends of the blades. The cowl pieces 47 on the rear or following faces of the blades 12 will fend off a portion of the air and direct the same against the auxiliary blades 40, while a part of the air will travel through the funnel elements 49 from the enlarged end through and out the restricted end. A portion of the air which is directed against the auxiliary blade 40 and between the same and the exterior wall of the funnel 49 will operate upon and turn the paddles 53 and direct the air against the panels 55. The combined result of the action of these parts against the air will serve to effect a direct or substantially vertical lift of the craft A. When the craft reaches the desired elevation, the motor or prime mover for the usual propeller C will either be initially started or the speed thereof increased to cause the same to drive the craft forwardly. At the same time, the connecting rod sections 63 and 65 will be uncoupled and the blades 12 of the rotary elements D and the other parts carried thereby will act in the capacity of auxiliary planing surfaces to the usual wings or airfoils B for sustaining the craft while in flight.

When it is desired to descend or land the craft, the motor for the driving propeller C will be cut off or cut down and the connecting rod sections 63 and 65 recoupled for bringing the rotary elements D again into operation. By turning the rotary elements D at the desired speed, a gradual substantially vertical descent of the craft may be negotiated.

In addition to the previously set forth functions of the accessory or device, it is apparent that the same acts in the capacity of a safety means which may be rendered active in event of motor failure where a forced landing must be made. It is also apparent that in event of the failure of the prime mover which drives the members D, the plane may be landed in the usual manner by gliding.

What is claimed is:

1. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof.

2. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof and transversely spaced longitudinally radiating fins on the leading or forward surfaces of said blades extending from the inner ends thereof toward the outer ends and terminating within the air scoops.

3. An accessory for lifing aircraft vertically and for controlling the vertical descent thereof, including a rotary member mounted on a transverse horizontal axis to turn in a vertical plane, said member including a pair of radially projecting blades having air scoops at the outer end of the forward or leading surface thereof and transversely spaced longitudinally radiating fins on the leading or forward surfaces of said blades extending from the inner ends thereof toward the outer ends and terminating within the air scoops, said fins having sections at the leading edges thereof mounted for relative lateral movement with respect to the remaining portions of the fins.

4. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof and transversely spaced longitudinally radiating fins on the leading or forward surfaces of said blades extending from the inner ends thereof toward the outer ends and terminating within the air scoops, said fins having sections at the leading edges thereof mounted for relative lateral movement with respect to the remaining portions of the fins and means for maintaining said fin sections in a normal neutral position for tensioning the same against lateral movement.

5. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof, said scoops being defined by marginal concavo-convex flanges of gradually diminishing size from their juncture with the blades to their outer ends.

6. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof, said scoops being defined by marginal concavo-convex flanges of gradually diminishing size from their juncture with the blades to their outer ends and keel strips spaced from the blades, disposed at the transverse center thereof in a plane perpendicular to the plane of the blade and having the innermost edges in a plane parallel to the blade and substantially in line with the outer edge of the flange defining the air scoop.

7. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof, said scoops being defined by marginal concavo-convex flanges of gradually diminishing size from their juncture with the blades to their outer ends, keel strips spaced from the blades, disposed at the transverse center thereof in a plane perpendicular to the plane of the blade and having the innermost edges in a plane parallel to the blade and substantially in line with the outer edge of the flange defining the air scoop and jib pieces supported at a forwardly and outwardly disposed inclination to the inner ends of the blades and in advance of the keel strips.

8. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof and cowl pieces disposed at the outer ends of the marginal edges of the blades and on the following or rear surface thereof.

9. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof, cowl pieces disposed at the outer ends of the marginal edges of the blades and on the following or rear surface thereof and funnel elements disposed on the following or rear face of the blades between the cowl piece and the inner end of the blade and spaced from the cowl piece.

10. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof, cowl pieces disposed at the outer ends of the marginal edges of the blades and on the following or rear surfaces thereof and funnel elements disposed on the following or rear face of the blades between the cowl piece and the inner end of the blade and spaced from the cowl piece, said funnel element having an enlarged intake outer end and a restricted outlet inner end.

11. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof, cowl pieces disposed at the outer ends of the marginal edges of the blades and on the following or rear surfaces thereof and funnel elements disposed on the following or rear face of the blades between the cowl piece and the inner end of the blade and spaced from the cowl piece, said funnel element having an enlarged intake outer end and a restricted outlet inner end, the said enlarged outer end being of greater size than the rear end of the cowl piece.

12. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof, cowl pieces disposed at the outer ends of the marginal edges of the blades and on the following or rear surfaces thereof, funnel elements disposed on the following or rear face of the blades between the cowl piece and the inner end of the blade and spaced from the cowl piece, said funnel element having an enlarged intake outer end and a restricted outlet inner end, the said enlarged outer end being of greater size than the rear end of the cowl piece and an auxiliary blade element disposed parallel to, supported by and spaced from the following or rear surface of the blade.

13. An accessory for lifting aircraft vertically and for controlling the vertical descent thereof, including a rotary member mounted on a transverse horizontal axis to turn in a vertical plane, said member including a pair of radially projecting blades having air scoops at the outer end of the forward or leading surface thereof, cowl pieces disposed at the outer ends of the marginal edges of the blades and on the following or rear surfaces thereof, funnel elements disposed on the following or rear face of the blades between the cowl piece and the inner end of the blade and spaced from the cowl piece, said funnel element having an enlarged intake outer end and a restricted outlet inner end, the said enlarged outer end being of greater size than the rear end of the cowl piece and an auxiliary blade element disposed parallel to, supported by and spaced from the following or rear surface of the blade, between which auxiliary blade and main blade, the cowl piece and funnel element are arranged.

THOMAS M. LEKA.